United States Patent

[11] 3,556,508

[72] Inventor Joseph Varga
 35 Brookdale Ave., Cedar Grove, N.J. 07009
[21] Appl. No. 710,147
[22] Filed Mar. 4, 1968
[45] Patented Jan. 19, 1971

[54] WELDING CLAMP
 1 Claim, 4 Drawing Figs.
[52] U.S. Cl.................................................... 269/155,
 228/44, 228/6, 29/493
[51] Int. Cl............................................... B25b 5/14,
 B23k 5/22
[50] Field of Search....................................269/321(ME),
 21, 37, 155; 74/80(Cursory); 29/493;
 228/4, 6, 44, 57

[56] References Cited
 UNITED STATES PATENTS
 2,320,805 6/1943 Smith............................ 269/321
 3,469,299 9/1969 Rogers.......................... 228/4

OTHER REFERENCES
" Jack Clamp" Publication, received Jan. 23, 1943, by Welding Tools & Engr. Corp. of Douglasville, GA, page 16

Primary Examiner—Andrew R. Juhasz
Assistant Examiner—Leon Gilden
Attorneys—Robert S. Dunham, P. E. Henninger, Lester W. Clark, John A. Harvey, Gerald W. Griffin, Thomas F. Moran, Howard J. Churchill and James A. Spady ABSTRACT: In welding two members along adjoining edges thereof, wherein is presented the problem that the edges are initially sprung apart out of weldable alignment, the improvement comprising a method and apparatus for overcoming the problem including, a screw clamp, the bed of which is secured to one of the members, and the screw of which is brought into engagement with the other of said members until the edges of the two members are brought into weldable alignment, after which the two members are welded along their adjoining edges, and the bed of the screw clamp is disengaged from the member to which it has been secured.

PATENTED JAN 19 1971   3,556,508
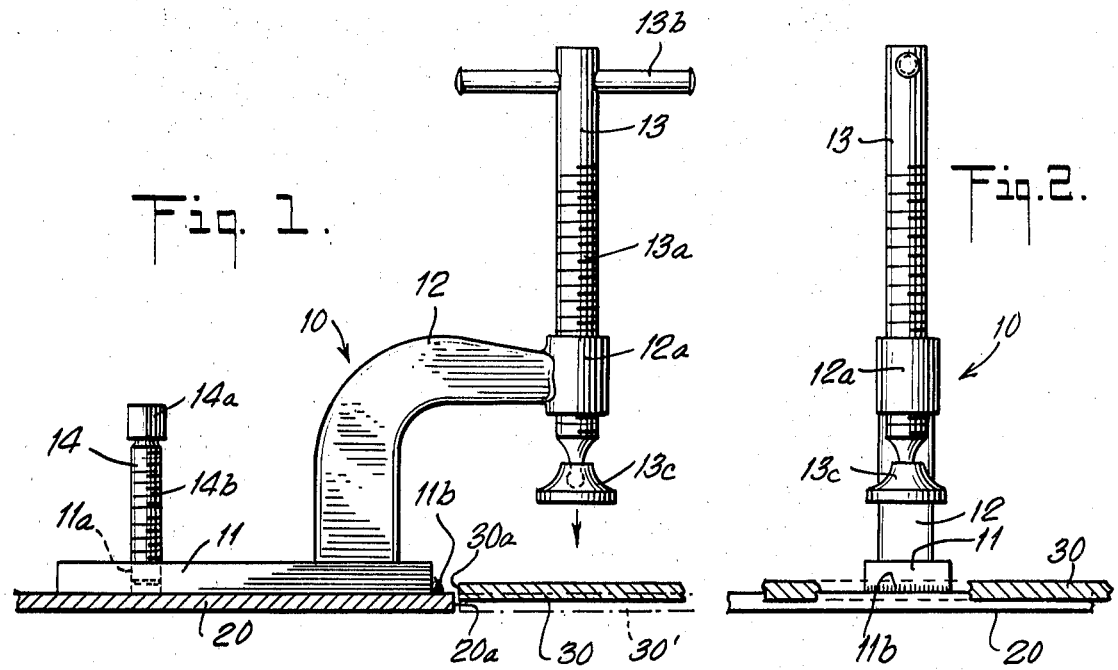
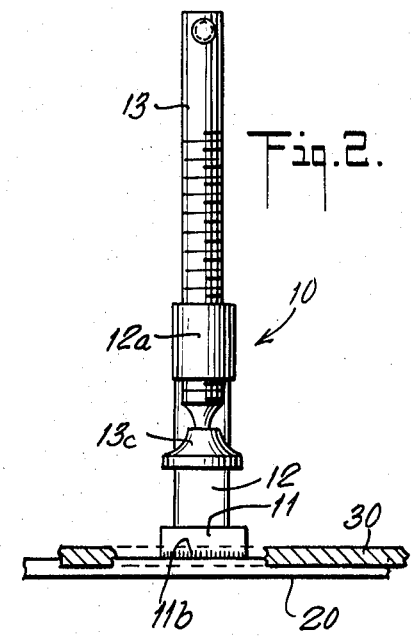
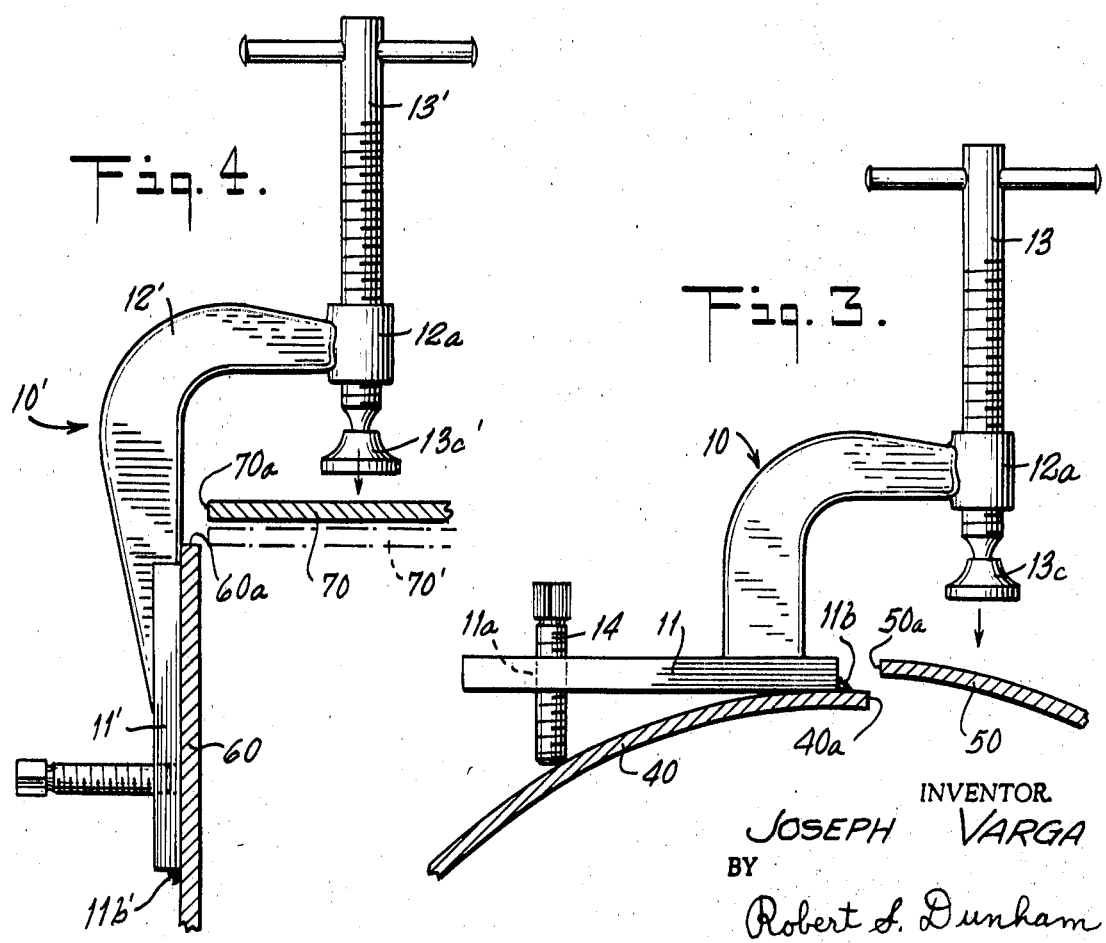
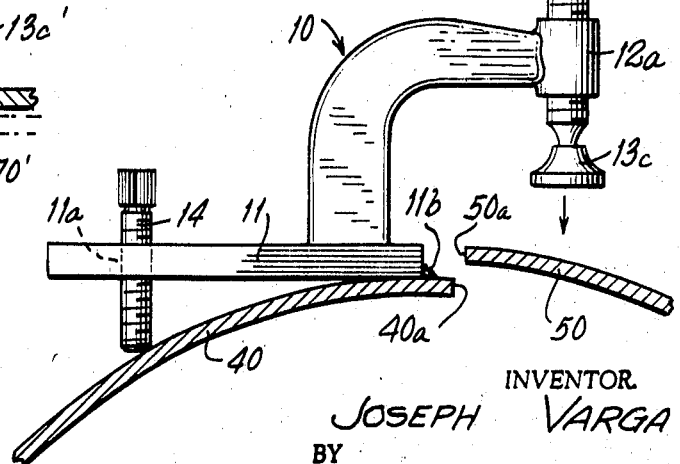
INVENTOR.
JOSEPH VARGA
BY
Robert S. Dunham
ATTORNEY 3,556,508

WELDING CLAMP

BACKGROUND OF THE INVENTION

When plate metal is welded edge to edge to form large construction, e.g. when plane or curved plate metal is butt welded to form tanks or vessels, the adjoining edges of two plates which must be welded together along those edges, seldom can be brought into alignment with facility during welding. This is so because any slight irregularity in the planarity or curvature, as the case may be, of contiguous plates will be reflected at their adjoining edges by a misalignment of the edges. In effect, one or the other of the plates is sprung inwardly or outwardly with respect to the other plate. In addition to irregularities in the plates themselves, each time a plate is welded, stresses are introduced which also tend to force it out of alignment somewhat, so that when the next plate is to be welded to that plate, the edge alignment problem is made still worse.

The result is that in building up constructions from welded plate metal, the welder is presented with an awkward problem of attempting to force in a sprung plate and hold it in correct alignment while at the same time performing the welding operation. The usual result is wasted time on the part of the welder, bad or repeated welds, and an unsightly lack of perfect alignment between adjoining welded plates.

BRIEF DESCRIPTION OF THE FIGURES

FIG. 1 shows an elevation view of a pair of planar plates in edgewise contiguity, with a clamp according to the invention secured to the relatively depressed plate with the screw of the clamp poised above the relatively elevated plate;

FIG. 2 shows an end view of the plates and clamp of FIG. 1;

FIG. 3 shows an elevation view of the clamp shown in FIG. 1 being employed to bring into edgewise alignment a pair of curved plates; and FIG. 4 shows a second embodiment of the clamp according to the invention, being employed to bring into edgewise alignment a pair of right-angle oriented plates.

DETAILED DESCRIPTION OF THE FIGURES

Referring now to the FIGS., there is shown in FIGS. 1—3 inclusive a first embodiment of a screw clamp indicated generally at 10 according to the invention. Screw clamp 10 comprises a flat bed 11, a neck portion 12 extending upwardly and laterally of bed 11 and terminated at an internally threaded collar portion 12a. Threadedly engaged within collar 12a is a screw portion 13 having threads 13a along the major longitudinal portion thereof, and being terminated at its upper portion by a handle 13b and at its lower portion by a swivel foot 13c. A screw 14 includes a head 14a and a threaded shank 14b which is threadedly engaged within an aperture 11a in bed 11, at a point remote from neck portion 12.

It will be understood that screw clamp 10 is not a true clamp in the sense that there is no opposition between the swivel foot 13c and the flat bed 11. Rather, the clamp 12 is intended specifically for use in the unique problem wherein a pair of members have their edges in proximity but out of alignment, there is no fixed surface to which either of the members can be clamped, and in which additionally access to the two members can be attained only from the same mutual side thereof.

Thus, in FIG. 1, a pair of planar plates 20 and 30 have their end edges 20a and 30a sufficiently close together to be welded, but out of alignment so that one plate is depressed at the mutual end edges 20a, 30a with respect to the other. In the case of planar plates 20, 30 the misalignment can be termed lack of planarity thereat. As aforesaid, this misalignment can result from irregularities in the planarity of each plate, or from a slight buckling of the welded joints (not shown) at the other end of each of plates 20, 30. When welding is to be practiced between edges such as 20a, 30a, there is no support surface to act as a reference for bringing the two misaligned edges 20a, 30a into alignment. Also, the nature of the construction of which plates 20, 30 are a part is such as to preclude applying a clamp to opposed surfaces of either or both plates 20, 30. That is to say, alignment of plates 20, 30 can be effected only by applying forces from one side of plates 20, 30.

The screw clamp 10 very efficiently solves this problem in the following manner. When edges 20a, 30a are found to be misaligned as illustrated in FIG. 1, one or more of the push clamps 10 are arranged so that the bed 11 lies against the relatively depressed plate, which in FIG. 1 is plate 20, and so that the swivel foot 13c overlies the relatively elevated plate, which in FIG. 1 is plate 30. It is a feature of the invention that when plates 20, 30 are skewed or otherwise buckled or warped, so that at some points along edges 20a, 30a plate 20 is depressed with relation to plate 30, while at other portions therealong plate 30 is depressed with regard to plate 20, a plurality of clamps 20 can be arranged along edges 20a, 30a, in all cases with the bed 11 resting on the plate which is relatively depressed at that locality.

Each clamp 10 is then welded as at 11b to the depressed plate upon which it rests, which in FIG. 1 is plate 20. It should be clearly understood that tack welding is most convenient for temporarily securing bed 11 to depressed plate 20, and is preferred by the welded and in this invention. However, other expedients can be employed, such for example as rendering bed 11 highly magnetized when plate 20 is a ferromagnetic material.

The handle 13b is then turned to advance swivel foot 13c in the direction shown by the arrow in FIG. 1, until swivel foot 13c abuts the surface of the relatively elevated plate, which in FIG. 1 is plate 30. Additional advancement of swivel foot 13c in the direction indicated by the arrow in FIG. 1 will drive plate 30, which can be regarded as sprung with respect to the depressed condition of plate 20, into alignment with plate 20 in the locality of clamp 10. The aligned position of plate 30 is indicated at 30' in phantom outline in FIG. 1. As aforesaid, multiple clamps 10 can be employed along the length of mutual edges 20a, 30a, and the clamps can be arranged so that the swivel foot 13c overlies either plate 20 or plate 30 depending upon which plate is elevated with respect to the other plate at its locality. By this means, a lengthy weld line along edges 20a, 30a can be made despite different degrees and even directions of misalignment between plates 20, 30 at various locations therealong.

As soon as the edges 20a, 30a are in alignment, a welding operation is effected therealong by the usual techniques known in the art. When the weld of edges 20a, 30a is set, each clamp 10 is removed from the workpiece 20, 30 by removing the spot welds 11b, or otherwise removing the temporary attachment between each bed 11 and the underlying plate, which in FIG. 1 is plate 20.

In FIG. 3 the clamp 10 is shown applied to a pair of curved plates 40, 50. In this instance the screw 14 is advanced through aperture 11a to contact the outer surface of the relatively depressed plate 40 and thereby allow the bed 11 to be positioned with respect to the outer surface of plate 40 so that at the spot weld point 11b the bed 11 is approximately tangential to the curve of plate 40. This is necessary so that the proper relationship between the direction of movement of the swivel foot 13c and the plate 50 can be attained. In all other regards, the alignment and welding of curved plates 40, 50 proceeds in the manner already described with respect to planar plates 20, 30. Curved plates such as 40, 50 are frequently encountered in building large pressure vessels such as gas storage facilities. Such plates are frequently misaligned in the manner indicated in FIG. 3, and it has heretofore been nearly impossible for a welded to align the edges 40a, 50a correctly along their entire length during the welding operation, because of the impossibility or inconvenience of gaining access to the interior of the vessel, i.e. the reverse sides of plates 40, 50.

In FIG. 4 there is shown the second embodiment of a screw clamp according to the invention indicated generally at 10'. The only difference between the clamp 10' shown in FIG. 4 and the clamp 10 shown in FIGS. 1—3, resides in the direction of movement of screw 13' with respect to a normal through the bed 11'. In the embodiment of FIGS. 1—3 a normal to the plane of bed 11 is parallel or essentially parallel to the axis of movement of screw 13. In FIG. 4, a normal to the plane of bed 11' is perpendicular, or essentially perpendicular, to the axis of movement of screw 13'. This is achieved by shaping neck portion 12' so as to move laterally of bed 11' and then downwardly thereof, and by arranging threaded collar 12a to have its axis essentially parallel to the plane of bed 11'.

The clamp 10' of FIG. 4 is employed, as illustrated, to bring into alignment for welding, a pair of plates 60, 70 which are intended to meet at right angles along their mutual edges 60a, 70a. As before, the bed 11' is spot welded at 11b' or otherwise secured to one of the plates, in the FIG., that being plate 60. The bed 11' is secured to plate 60 rather than to plate 70, because inspection shows that it is plate 70 which is sprung with respect to plate 60. This is determined by examining the distance between the plane of plate 60 and the end edge 70a of plate 70, as compared to the distance between the plane of plate 70 and the end edge 60a of plate 60. As can be seen in FIG. 4, end edge 70a is sufficiently close to the plane of plate 60 to allow welding, but end edge 60a is not sufficiently close to the plane of plate 70 to allow welding. Accordingly, this means that plate 70 is sprung with relationship to plate 60. Therefore, the bed 11' is secured to plate 60, so that the swivel foot 13c' will overlie plate 70, and drive plate 70 toward plate 60 so that the gap between the plane of plate 70 and the end edge 60a of plate 60 is diminished.

The final alignment of plate 70 is shown in phantom outline at 70' in FIG. 4. When this alignment has been attained, a weld is perfected along the adjoining edges 60a, 70a. When the weld is set, the clamp 10' is removed by breaking or melting the spot welds 11b', to free the finished workpiece.

It will be understood that when pieces are to be edge welded which meet at an angle intermediate 180° (FIG. 1) and 90° (FIG. 4), that the clamp shown in the embodiment of FIG. 1 can be employed together with employment of the screw 14 in the manner shown in FIG. 3. Alternatively, modified clamps 10 intermediate those shown in FIGS. 1 and 4 can be employed for intermediate workpiece joint angles. It is considered more convenient however, to employ only the two embodiments of clamp shown respectively in FIGS. 1 and 4, and to additionally employ the screw 14 to accommodate intermediate workpiece joint configurations.

The invention has been described with a certain degree of particularity; however, it should be understood that the specific embodiments have been set forth merely to illustrate the principles of the invention, and that the invention is not limited thereto.

I claim:

1. A clamp for aligning a pair of misaligned edges of metal plates comprising a bed plate, a neck extending beyond one edge of said bed plate, a threaded passage extending through said neck at a portion clear of said bed plate, a screw extending through said passage adapted to contact the first of a pair of misaligned planar plates, the longitudinal axis of said screw being noncoincident with any normal of said bed plate, a screw threaded passage extending through said bed plate essentially normal through and at the edge thereof remote from said neck, and a screw extending through said passage adapted to be driven into contact with the second of a pair of misaligned plates.

6979-PEH

UNITED STATES PATENT OFFICE
CERTIFICATE OF CORRECTION

Patent No. 3,556,508          Dated January 19, 1971

Inventor(s) JOSEPH VARGA

It is certified that error appears in the above-identified patent and that said Letters Patent are hereby corrected as shown below:

Col. 1, line 2, for "construction" read --constructions--

Col. 2, line 14, for "clamps 20" read --clamps 10--

Col. 2, line 22, for "welded" read --welder--

Col. 2, line 67, for "welded" read --welder--

Signed and sealed this 25th day of May 1971.

(SEAL)
Attest:

EDWARD M. FLETCHER, JR.
Attesting Officer

WILLIAM E. SCHUYLER, JR.
Commissioner of Patents